(12) United States Patent
Bonnah, II et al.

(10) Patent No.: US 9,777,760 B1
(45) Date of Patent: Oct. 3, 2017

(54) LOCKNUT WITH LOCKING COIL AND COIL SUPPORT

(71) Applicant: LockOn LLC, Byron Center, MI (US)

(72) Inventors: Harrie W. Bonnah, II, East Grand Rapids, MI (US); Dennis James Anderson, Coopersville, MI (US)

(73) Assignee: FLOW-RITE CONTROLS, LTD., Byron Center, MI (US)

( * ) Notice: Subject to any disclaimer, the term of this patent is extended or adjusted under 35 U.S.C. 154(b) by 52 days.

(21) Appl. No.: 15/144,033

(22) Filed: May 2, 2016

(51) Int. Cl.
*F16B 37/12* (2006.01)
*F16B 39/12* (2006.01)

(52) U.S. Cl.
CPC .............. *F16B 37/12* (2013.01); *F16B 39/12* (2013.01)

(58) Field of Classification Search
CPC .......... F16B 37/12; F16B 39/08; F16B 39/12; F16B 39/14; F16B 39/20; F16B 39/26
USPC .......................................... 411/204, 251–251
See application file for complete search history.

(56) References Cited

U.S. PATENT DOCUMENTS

| | | | |
|---|---|---|---|
| 152,249 A | 6/1874 | Penfield | |
| 422,027 A | 2/1890 | Marshall | |
| 597,260 A * | 1/1898 | Buffington | F16B 39/14 411/249 |
| 614,835 A * | 11/1898 | Carruthers | F16B 39/20 411/251 |
| 637,360 A | 11/1899 | Stark | |
| 900,589 A | 10/1908 | Ratcliffe | |
| 960,349 A | 6/1910 | Lafleur | |
| 988,911 A | 4/1911 | Terry | |
| 1,017,845 A | 2/1912 | Brown | |
| 1,081,965 A | 12/1913 | Kester | |
| 1,172,722 A | 2/1916 | Millard | |
| 1,179,446 A | 4/1916 | Mennie | |
| 1,267,656 A | 5/1918 | Goserud | |

(Continued)

FOREIGN PATENT DOCUMENTS

| | | |
|---|---|---|
| AT | 375452 | 8/1984 |
| CH | 209896 | 5/1940 |

(Continued)

OTHER PUBLICATIONS

United States Statutory Invention Registration No. H1588, published Sep. 3, 1996, entitled "Helical Spring Fastener".

(Continued)

*Primary Examiner* — Roberta Delisle
(74) *Attorney, Agent, or Firm* — Warner Norcross and Judd LLP

(57) ABSTRACT

A locking fastener includes a thermoplastic fastener body, a locking coil, and a support collar. The fastener body defines a cylindrical cavity and a radially extending slot communicating with the cavity. The support collar has an arcuate portion and first and second tabs extending radially outward from the arcuate portion. The support collar is disposed within the fastener body with the arcuate portion adjacent the cavity wall and the tabs extending into the slot. The locking coil has a helical portion and first and second tangs extending radially outward from the helical portion. The helical portion of the locking coil is positioned within the support collar, and the first and second tangs extend into the slot and between the first and second tabs.

20 Claims, 5 Drawing Sheets

(56) References Cited

U.S. PATENT DOCUMENTS

| | | | | |
|---|---|---|---|---|
| 1,342,319 | A | * | 6/1920 | Anderson ............... F16B 39/12 411/350 |
| 1,355,342 | A | | 10/1920 | Kellogg |
| 1,440,324 | A | | 12/1922 | Witaker |
| 1,502,555 | A | | 7/1924 | Eklund |
| 1,550,282 | A | | 8/1925 | Rennerfelt |
| 1,630,958 | A | | 5/1927 | Mauch |
| 1,830,918 | A | | 11/1931 | Sundh |
| 1,830,920 | A | | 11/1931 | Sundh |
| 1,909,400 | A | | 5/1933 | Hall |
| 1,929,169 | A | | 10/1933 | Hall |
| 2,128,938 | A | * | 9/1938 | Hall ........................ F16B 39/14 411/204 |
| 2,233,889 | A | | 3/1941 | Hood |
| 2,255,948 | A | | 9/1941 | Swanstrom |
| 2,320,032 | A | | 5/1943 | Danforth |
| 2,324,731 | A | | 7/1943 | Simmonds |
| 2,367,929 | A | | 1/1945 | Colman |
| 2,432,805 | A | | 12/1947 | Robertson |
| 2,497,081 | A | | 2/1950 | Hattan |
| 2,515,220 | A | | 7/1950 | Hattan |
| 2,562,621 | A | | 7/1951 | Larson |
| 2,587,560 | A | | 2/1952 | Widmer |
| 2,775,281 | A | | 12/1956 | Smith |
| 2,823,725 | A | | 2/1958 | Trinca |
| 3,391,720 | A | | 7/1968 | Morse |
| 3,565,149 | A | | 2/1971 | Wetzel |
| 3,589,423 | A | | 6/1971 | Metz |
| 3,701,372 | A | | 10/1972 | Breed |
| 4,004,486 | A | | 1/1977 | Schenk |
| 4,040,462 | A | | 8/1977 | Hattan |
| 4,069,855 | A | | 1/1978 | Petroshanoff |
| 4,334,438 | A | | 6/1982 | Mochida |
| 4,357,726 | A | | 11/1982 | Trimmer |
| 4,692,078 | A | | 9/1987 | Dessouroux |
| 4,983,085 | A | | 1/1991 | Gray |
| 5,449,259 | A | | 9/1995 | Clohessey |
| 5,529,348 | A | | 6/1996 | Wasserman et al. |
| 6,015,251 | A | | 1/2000 | Chung |
| 8,016,532 | B2 | | 9/2011 | Park |
| 8,021,093 | B2 | | 9/2011 | Campau |
| 8,113,234 | B2 | | 2/2012 | Campau |
| 8,177,468 | B2 | | 5/2012 | Campau |
| 8,425,168 | B2 | | 4/2013 | Campau |
| 8,439,616 | B2 | | 5/2013 | Campau |
| 8,734,072 | B2 | | 5/2014 | Campau |
| 8,899,896 | B1 | | 12/2014 | Campau |
| 2011/0176887 | A1 | | 7/2011 | Im |

FOREIGN PATENT DOCUMENTS

| | | |
|---|---|---|
| EP | 1760334 | 3/2007 |
| FR | 582530 | 12/1924 |
| FR | 1032330 | 7/1953 |
| FR | 1101421 | 10/1955 |
| FR | 1108071 | 1/1956 |
| FR | 1377030 | 10/1964 |
| FR | 2544030 | 10/1984 |
| GB | 4780 | 0/1909 |
| GB | 27703 | 0/1910 |
| GB | 221456 | 9/1924 |
| JP | 2003307210 | 10/2003 |
| WO | 2013112254 | 8/2013 |
| WO | 2014193535 | 12/2014 |

OTHER PUBLICATIONS

International Search Report and Written Opinion from PCT/US2017/021735 dated May 25, 2017.

* cited by examiner

LOCKNUT WITH LOCKING COIL AND COIL SUPPORT

BACKGROUND OF THE INVENTION

The present invention relates to locknuts, and more particularly to locknuts including a locking coil.

Locknuts (also known as lock nuts, locking nuts, prevailing torque nuts, stiff nuts, and elastic stop nuts) are nuts that resist loosening under vibrations and torque.

One type of locknut includes a nut body and a locking coil within the nut body that acts as a locking element. In the installation or tightening direction, the nut body dilates the locking coil, which causes the coil to loosen its grip on the threaded member to permit relatively easy rotation. In the removal or loosening direction, the nut body contracts the locking coil, which causes the coil to tighten its grip on the threaded member to prevent unintended relative rotation (i.e. loosening). When the locknut is tightened against an object, a force balance exists between (a) the force of the face of the nut body against the object and (b) the force of the dilated locking coil against the interior perimeter of the nut body. The interior force is absorbed and managed by the inner diameter (ID) of the nut body.

In this type of locknut, both the nut body and the locking coil are fabricated of metal in order to withstand the described forces. While applications exist where a plastic nut body might be desired, a plastic nut body has not proven to be practical. This is because the force of the dilated metal locking coil on the plastic nut body over time will cause the nut body to experience creep (also known as cold flow), which is product deformation at ambient temperature under force over time. As the plastic creeps under load, the retention force balance will degrade, will fall out of specification, and eventually may decrease to such a state that the jointed retention will be lost completely. Consequently, plastic nut bodies are not a practical option for a locknut.

SUMMARY OF THE INVENTION

The present invention overcomes the aforementioned issue by providing a locknut (or other locking fastener) having a construction that includes a plastic nut body, maintaining its performance over time.

The locking fastener includes a plastic/thermoplastic fastener body, a locking coil, and a support collar. The thermoplastic fastener body has a circumferential wall that defines a cylindrical cavity and a radially extending slot communicating with the cylindrical cavity. The support collar has an arcuate portion and first and second tabs extending radially outward from the arcuate portion and is located within the fastener body. The arcuate portion is positioned within the cavity and adjacent the circumferential wall, and the tabs extend into the slot. The collar may be fabricated of metal or another material stronger than the thermoplastic nut body. The locking coil has a helical portion and first and second tangs extending radially outward from the helical portion. The helical portion of the locking coil is positioned within the support collar, and the first and second tangs extend into the slot and between the first and second tabs. The locking fastener is rotated in a clockwise direction, forcing the first tang into contact with the first support collar tab. This contact force slightly expands the locking coil and reduces friction between the locking coil and the threaded member such that the locking coil does not prevent rotation of the fastener body onto the threaded member.

The collar provides enhanced strength and reduces or eliminates creep within the thermoplastic nut body. Specifically, the arcuate portion of the collar absorbs the radial force of the dilated locking coil; and the tabs of the collar absorb the force or pressure of the locking coil tangs. Accordingly, the locking fastener enables the use of a plastic nut body; and the performance of the locking fastener does not degrade over time.

These and other advantages and features of the invention will be more fully understood and appreciated by reference to the description of the current embodiments and the drawings.

DESCRIPTION OF THE CURRENT EMBODIMENT

Figure 1:
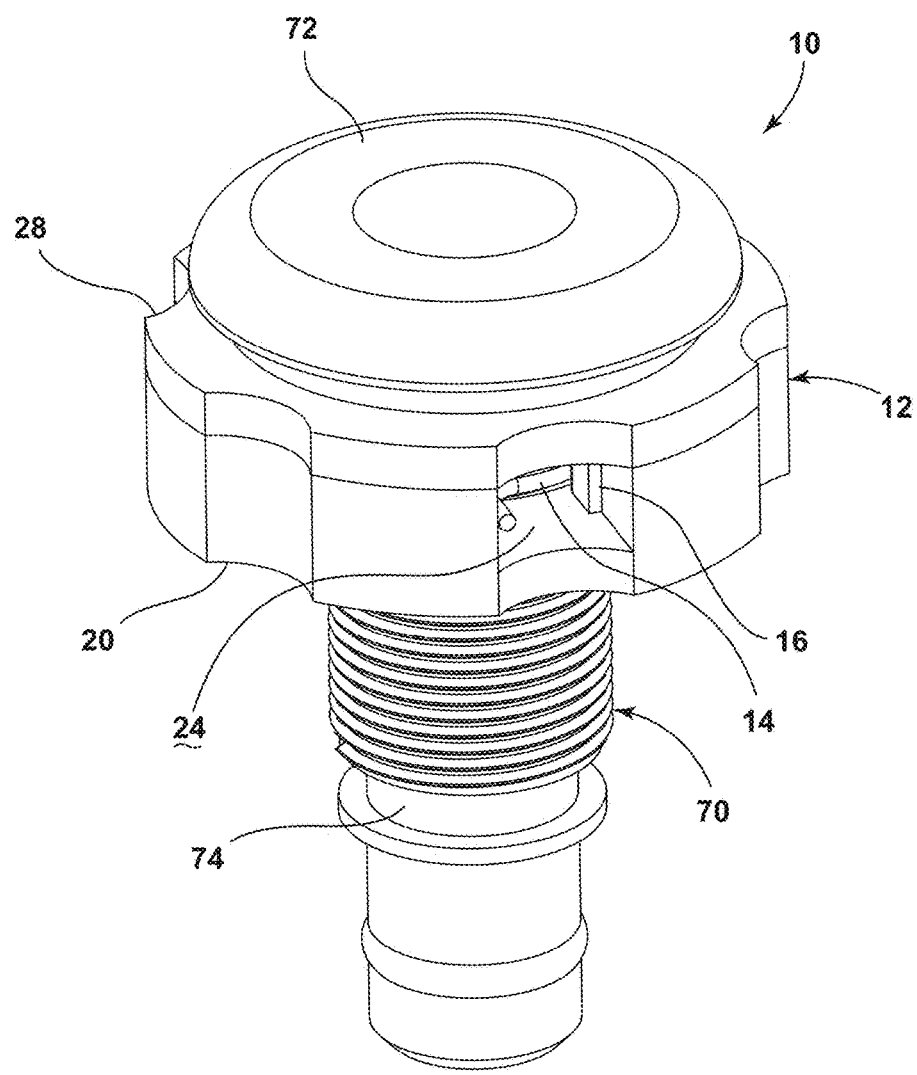
FIG. 1 is a perspective view of the locking fastener.

Before the current embodiment of the invention is described, it is pointed out that the invention is not limited to the details of operation, the details of construction, or the arrangement of the components set forth in the following description or illustrated in the drawings. The invention may be implemented in various other embodiments and may be practiced or carried out in alternative ways not expressly disclosed herein. Also, it is pointed out that the terminology used herein is for the purpose of description and should not be regarded as limiting. The use of "including" and "comprising" and variations thereof encompasses the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

A locking fastener constructed in accordance with one embodiment of the invention is illustrated in FIGS. 1-6 and generally designated 10. Though shown in the figures as a retaining nut or a locknut, the concepts of the present invention can be incorporated into a variety of fasteners as will be recognized by those skilled in the art.

The locking fastener 10 includes a fastener body 12, a locking coil, element, spring, or band 14, and a support collar 16. The fastener body 12 is a generally hex-shaped lobed member that is configured to be grasped and rotated by hand. The body may have a wide variety of configurations depending on the application, such as for example hex-shaped with flats to be driven by a conventional driving tool (not shown). Alternatively, the fastener body 12 may be square, otherwise polygonal, or any other shape. The fastener body 12 is formed of plastic, thermoplastic, or of any other material subject to creep or cold flow.

Figure 2:
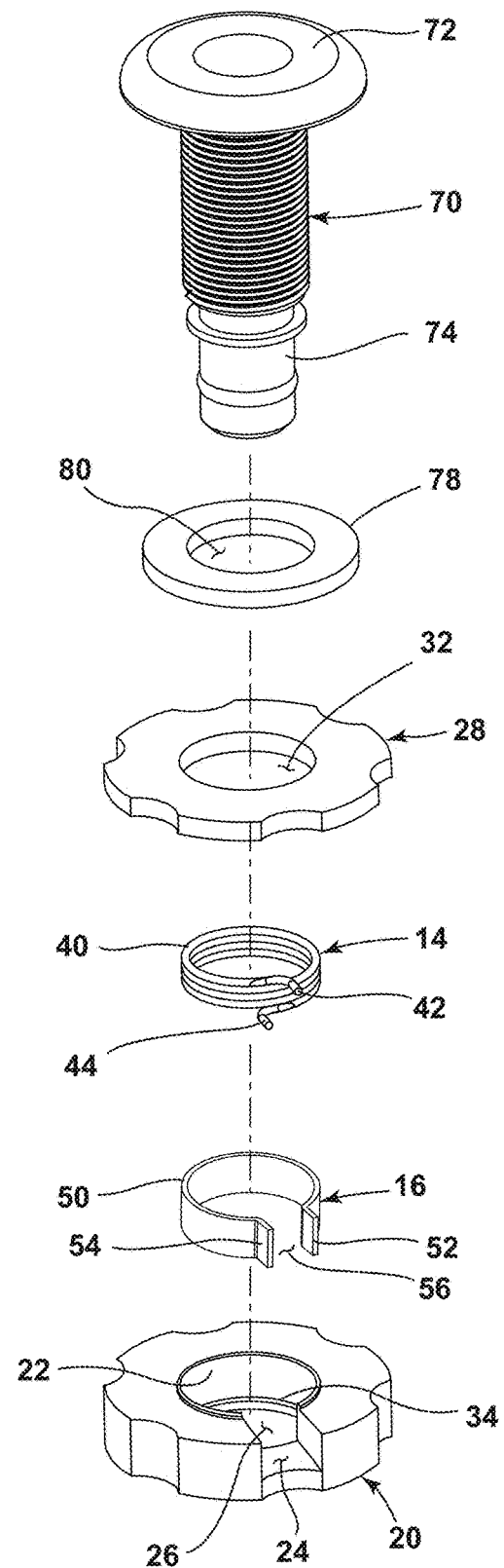
FIG. 2 is an exploded view of the locking fastener.
Figure 3:
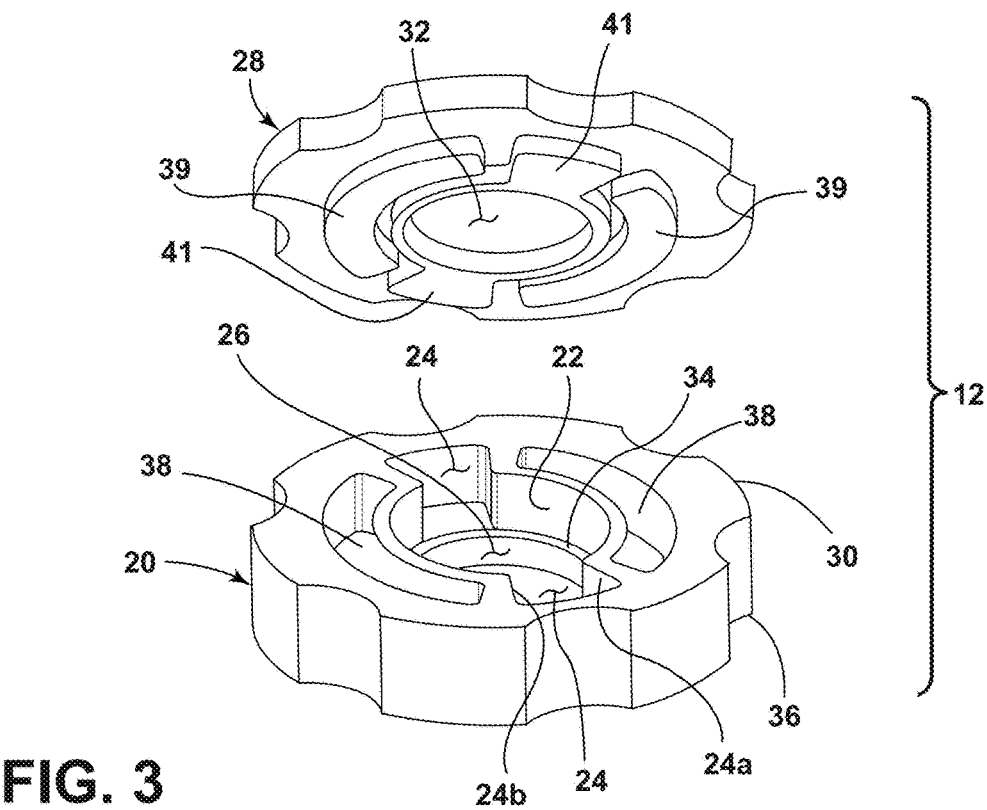
FIG. 3 is an exploded view of a fastener body of the locking fastener.

Referring now to FIGS. 2-3, the fastener body 12 includes a main body portion 20 with an inner circumferential wall 22 that defines a bore or cylindrical cavity 26. The main body portion 20 further defines a radially extending slot 24 communicating with the cylindrical cavity 26 and extending entirely through the main body portion 20. The fastener body 12 is unthreaded and has an inner diameter D. A cap 28 encloses an upper end 30 of the main body portion 20.

The cap 28 is substantially flat with generally the same perimeter shape as the main body portion 20 and has a central aperture 32 with a diameter $D_C$. The cap 28 may be ultra-sonically welded to the main body portion 20, or may be affixed by other suitable adhesives or attachment methods.

In another embodiment illustrated in FIG. 3, the main body portion 20 and cap 28 may also include mating alignment features. In the illustrated example, the main body portion 20 includes annular channels 38 and opposed slots 24 on the upper surface 30 thereof, and the cap 28 includes complementary annular beads 39 and tabs 41 configured to mate within the channels 38 and slots 24, respectively. The described alignment features are symmetrical, enabling the spring 14 and cap 28 to be rotated 180° in either direction relative to the main body portion 20. Further, the slots 24 may not extend entirely through the main body portion 20, leaving an exterior wall thickness and enclosing the slot 24.

The fastener body 12 also includes a lower shoulder 34 which has a shoulder diameter $D_S$. The shoulder 34 extends into the cavity 26 adjacent a lower end 36 of the fastener body 12. The diameter $D_S$ of the shoulder 34 is less than the diameter D of the cylindrical cavity 26.

Referring back to FIG. 2, the locking coil 14 includes a coil or helical portion 40, a first tang 42, and a second tang 44. The first and second tangs 42, 44 extend radially outward from the helical portion 40. As illustrated, the first and second tangs are bent substantially perpendicular to the axis of the helical portion 40, but other shapes, including smooth curves and angles, are also contemplated. In the illustrated example, the locking coil 14 has four full helical turns, and the first and second tangs 42, 44 are radially separated. Alternatively, the locking coil 14 may include more or fewer turns.

The helical portion 40 of the locking coil 14 has an outer diameter $D_{LCO}$ which is greater than the shoulder diameter $D_S$. In the current embodiment, the locking coil 14 is fabricated of wire or other stock having a circular cross section. Other cross-sectional shapes are possible including square, rectangular, ovate, and triangular. The cross-sectional thickness (e.g. diameter), regardless of shape, generally corresponds to the thread pitch of a threaded member, as described below, such that the turns of the locking coil 14 fit within the threads of the threaded member.

Figure 4:
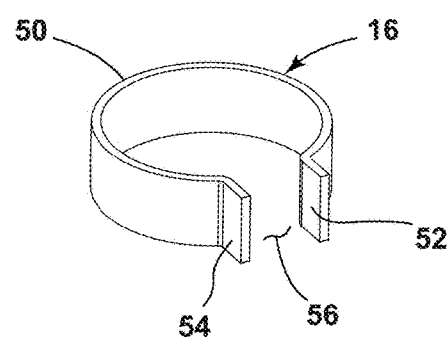
FIG. 4 is a perspective view of a support collar of the locking fastener.

Referring to FIG. 4, the support collar 16 is a generally ring-shaped member having an arcuate portion 50 and first and second tabs 52, 54 that extend radially outward from the arcuate portion 50. The first and second tabs 52, 54 are spaced, defining a gap 56 therebetween. The arcuate portion 50 has a diameter $D_{SC}$ which is greater than the shoulder diameter $D_S$. The support collar 16 may be manufactured of a flat metal that is formed using a suitable material and forming operation. Alternatively, the support collar 16 can be formed of any suitably rigid material, including metals and composites. The material is selected to prevent creep within the plastic fastener body 12.

Figure 5:
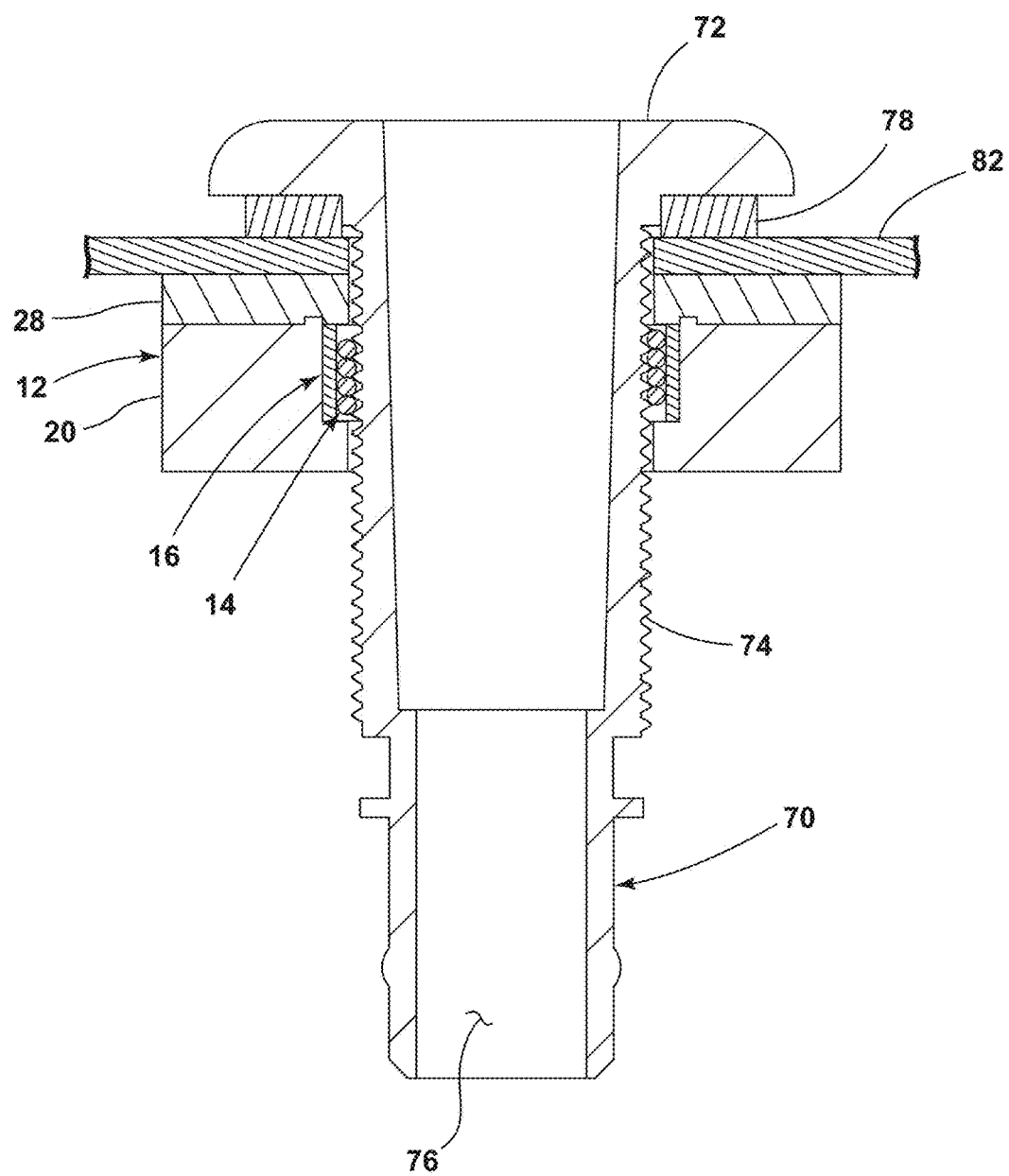
FIG. 5 is a cross-sectional view of the locking fastener installed on a boat hull.
Figure 6:
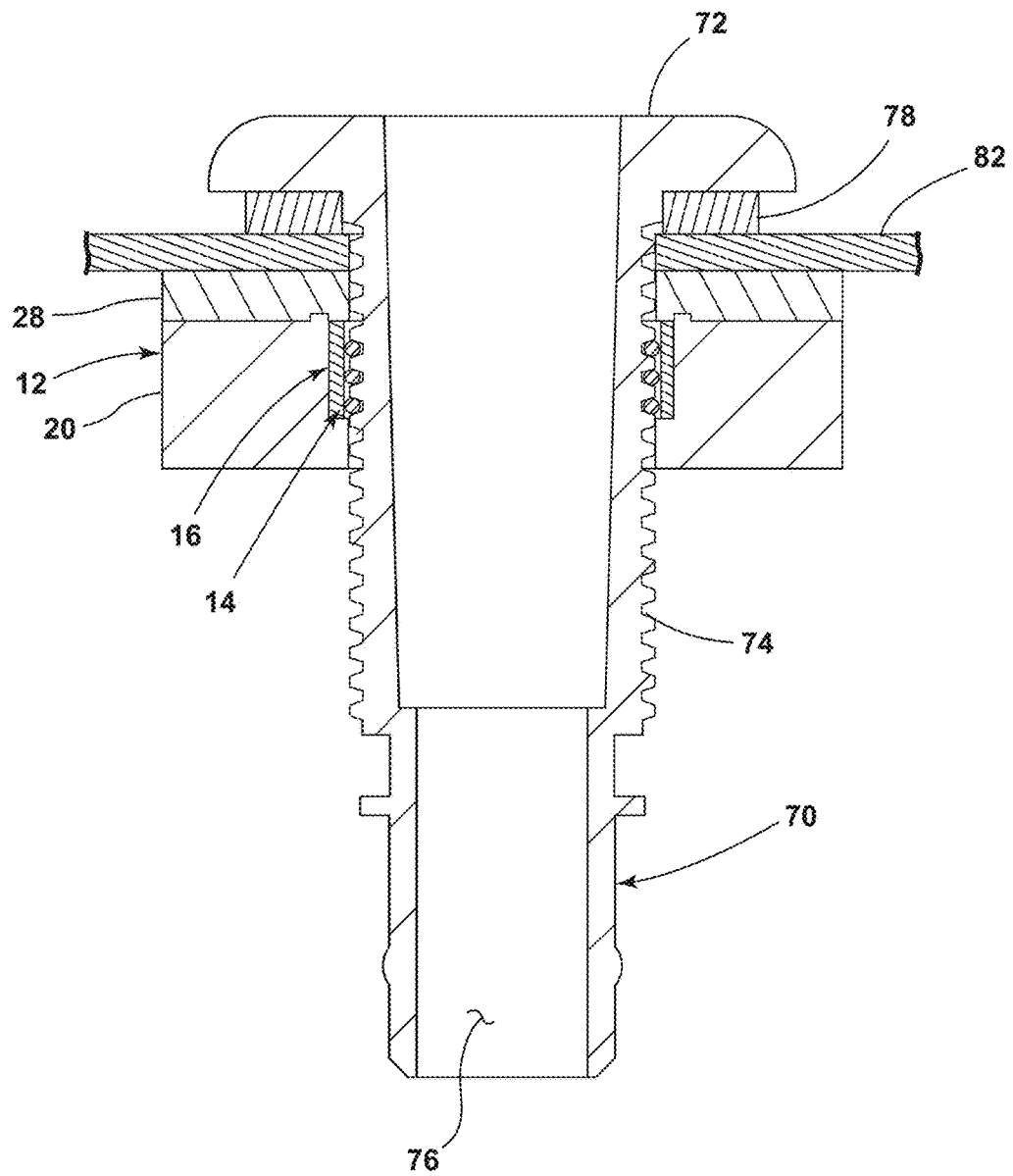
FIG. 6 is a cross-sectional view of the locking fastener installed on a boat hull, illustrating Acme type threads on a threaded member of the locking fastener.

As illustrated in FIGS. 2 and 5-6, the locking fastener 10 also includes an externally threaded member 70 onto which the fastener body 12 is installed. The threaded member 70 has a standard thread form, as shown in FIG. 5, though other possible thread forms are contemplated, including Acme threads, as shown in FIG. 6. The threaded member 70 includes a head 72 and a hollow, threaded shank 74. The hollow shank 74 defines a conduit 76 through which fluid or other material may pass or be pumped through the locking fastener 10. Alternatively, the threaded member may be a shaft, bolt, or tube, and the shank may be solid.

Also included is a seal or gasket 78 having a central opening 80. The gasket 78 is positioned beneath the head 72 and is configured to engage a boat hull, wall stock, panel, or other structure 82 in which the locking fastener 10 may be mounted.

The helical portion 40 of the locking coil 14 is disposed within the support collar 16, and the locking coil 14 is oriented such that the radially extending first and second tangs 42, 44 are positioned between the first and second tabs 52, 54 of the support collar 16 and extend into the slot 24 and gap 56 between the tabs 52, 54. The arcuate portion 50 of the support collar 16 is positioned within the fastener body 12, adjacent the circumferential wall 22. Further, the first and second tabs 52, 54 are positioned adjacent walls 24a, 24b of the slot 24 and extend at least partially into the slot 24. Both the locking coil 14 and support collar 16 are supported on the lower shoulder 34 of the fastener body 12.

The cross-sectional view of FIG. 5 illustrates the diametrical relationship of the locking fastener 10 components. Both the support collar 16 and locking coil 14 may be sized to fit the desired fastener body 12 and externally threaded member 70. The outside diameter ($D_{SC}$ plus wall stock thickness) of the support collar 16 may be selected to substantially match or closely fit within the inner diameter D of the cylindrical cavity 26 of the fastener body 12. The locking coil 14 may be sized to fit within the support collar 16. The outer diameter $D_{LCO}$ of the locking coil 14 substantially matches the diameter $D_{SC}$ of the support collar 16, preventing the locking coil 14 from expanding or dilating when the fastener body 12 is mounted to the threaded member 70. Further, the diameter $D_S$ of the shoulder 34 may be selected to support the locking coil 14 and support collar 16 thereon, yet match or provide clearance to the threads of the threaded member 70. The major diameter of the threaded member 70 may be selected to be less than the diameter $D_S$ of the shoulder 34 and/or the outer diameter $D_{LCO}$ of the locking coil 14, and greater than the inner diameter $D_{LCI}$ of the locking coil 14. As described above, the wire diameter of the locking coil 14 generally corresponds to the pitch of the threaded member 70, such that the turns of the locking coil 14 fit within the threads of the threaded member 70.

The components as thus far described collectively comprise a thru-hull fitting for a boat as might be used in conjunction with a live bait well and/or bailing equipment. This is but one example of an application of the locking fastener 10. The potential applications are virtually limitless, and the present invention is not limited to the thru-hull fitting environment.

Assembly

To assemble the locking fastener 10, the support collar 16 is inserted through the open upper end 30 of the fastener body 12 and into the cylindrical cavity 26; the first and second tabs 52, 54 are positioned within the slot 24. The support collar 16 may be lightly pressed into the cylindrical cavity 26 and the tabs 52, 54 may bear against the walls 24a, 24b of the slot 24. The locking coil 14 is then positioned within the support collar 16, with the first and second tangs 42, 44 extending into the gap 56 between first and second tabs 52, 54. In this relaxed state, the tangs 42, 44 do not necessarily touch or press against the first and second tabs 52, 54 of the support collar 16.

Once the support collar 16 and locking coil 14 have been installed, the cap 28 may be placed onto the main body portion 20 and affixed thereto. The cap 28 can be ultrasonically welded to the main body. Of course, any suitable method of affixing the cap 28 to the main body portion 20 may be used, including using adhesive. The retainer 78 is positioned atop the fastener body 12.

The threaded member 70 may be inserted through the retainer 78 and fastener body 12, extending into the cylindrical cavity 26 and engaging the locking coil 14. Threading the threaded member 70 into the locking coil 14 presses the helical portion 40 securely against the threads. The support collar 16 reinforces the thermoplastic fastener body 12 against the force applied by the locking coil 14.

Operation

To install the locking fastener 10 to a boat hull or other object 82, the threaded member 70 is inserted through an opening in the boat hull 82, and the locking fastener 10 is installed onto the threaded member 70 from the opposite side of the boat hull 82. The locking fastener 10 is rotated in a first or generally clockwise direction, forcing the first tang 42 into contact with the first support collar tab 52. This contact force slightly expands the locking coil 14 and reduces friction between the locking coil 14 and the threaded member 70 such that the locking coil 14 does not inhibit installation of the fastener body 12 onto the threaded member 70.

The locking fastener 10 is rotated until it engages the boat hull 82. When the locking fastener 10 is released and is no longer being rotated, the locking coil 14 contracts to apply a radial force against the threads of the threaded member 70. Further, the locking fastener 10 pulls the head 72 of the threaded member 70 against the boat hull 82, creating a clamping force therebetween. The applied radial and clamping forces create a force balance, creating equilibrium within the locking fastener 10 and locking the joint in place.

Conversely, to remove the locking fastener 10, the locking fastener 10 is rotated in a second or generally counterclockwise direction, forcing the second tang 44 into contact with the second support collar tab 54. As with installation, this contact force slightly expands the locking band 14 and reduces or eliminated friction between the locking element 10 and the threaded member 70, allowing removal of the fastener body 12 from the threaded member 70.

The support collar 16, being metallic and generally rigid, provides reinforcement to the plastic fastener body 12 to resist the applied forces and prevent creep within the fastener body 20. Further, when the tangs 42, 44 expand enough to press or bias against the tabs 52, 54, the support collar 16 provides reinforcement to resist the force applied to the sidewalls of the slot 24.

Generally, when using a threaded fastener as a thru-hull fitting for a boat as might be used in conjunction with a live bait well and/or bailing equipment, it is necessary to have an operator on the exterior of the boat hull to prevent rotation of the threaded member, while a second operator is on the interior of the boat to rotate the fastener body onto the threaded member. However, the locking fastener 10 of the present invention may be installed by a single operator without holding the threaded member from the outside of the boat hull to prevent rotation thereof. The fastener body 12 may be installed without causing the threaded member 70 to also rotate. Further, the locking fastener 10 may be hand tightened and does not necessarily require the use of a torque wrench.

The fastener body 20 is able to be manufactured from an economical, inert thermoplastic while providing consistent differential torque performance.

The above description is that of a current embodiment of the invention. Various alterations and changes can be made without departing from the spirit and broader aspects of the invention as defined in the appended claims, which are to be interpreted in accordance with the principles of patent law including the doctrine of equivalents.

This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims.

Directional terms, such as "vertical," "horizontal," "top," "bottom," "upper," "lower," "inner," "inwardly," "outer," "outwardly," "clockwise," and "counterclockwise" are used to assist in describing the invention based on the orientation of the embodiments shown in the illustrations. The use of directional terms should not be interpreted to limit the invention to any specific orientation(s). Any reference to claim elements in the singular, for example, using the articles "a," "an," "the," or "said," is not to be construed as limiting the element to the singular unless expressly stated in the issued claims.

The invention claimed is:

1. A locking fastener comprising:
    a plastic fastener body including a circumferential wall defining a cylindrical cavity, the wall further defining a radially extending slot communicating with the cylindrical cavity;
    a support collar having an arcuate portion and first and second tabs extending radially outward from the arcuate portion, the support collar being within the fastener body, the arcuate portion being within the cavity and adjacent the circumferential wall, the tabs extending into the slot; and
    a locking coil having a helical portion and first and second tangs extending radially outward from the helical portion, the helical portion of the locking coil being within the support collar, the first and second tangs extending into the slot and between the first and second tabs, whereby the first tang engages the first tab when the locking fastener is turned in a first direction, and the second tang engages the second tab when the locking fastener is turned in a second direction.

2. The locking fastener of claim 1 including an externally threaded member on which the locking fastener is mounted.

3. The locking fastener of claim 2 wherein the pitch of the locking coil corresponds to the pitch of the threaded member.

4. The locking fastener of claim 2 wherein the threaded member is hollow.

5. The locking fastener of claim 2 including a gasket disposed between the fastener body and a head of the threaded member.

6. The locking fastener of claim 1 wherein the plastic fastener body includes a main body and a cap, the cap enclosing an upper end of the main body.

7. The locking fastener of claim 6 wherein the cap is ultra-sonically welded to the main body.

8. A locking fastener assembly comprising:
   an unthreaded, plastic fastener body comprising a main body having a circumferential wall with a slot therethrough and a cap enclosing an upper end of the main body;
   a support collar including a curved portion and first and second tabs extending radially outward from the curved portion, the support collar disposed within the fastener body and the tabs extending into the slot;
   a locking coil including a helical portion having multiple turns and first and second tangs extending radially outward from the helical portion, the locking coil disposed within the support collar, the first and second tangs received between the first and second tabs; and
   an externally threaded member on which the fastener body is mounted, the turns of the locking coil bearing against adjacent threads of the threaded member.

9. The locking fastener assembly of claim 8 wherein the first tang engages the first tab when the fastener body is turned in a first direction, the second tang engages the second tab when the fastener body is turned in a second direction, and the support collar reinforces the plastic fastener body.

10. The locking fastener assembly of claim 8 wherein the fastener body includes a lower shoulder, the locking coil retained within the fastener body between the shoulder and the cap.

11. The locking fastener assembly of claim 10 wherein the cap is ultra-sonically welded to the main body.

12. The locking fastener assembly of claim 8 wherein the locking coil includes two or more turns.

13. The locking fastener assembly of claim 8 wherein the locking coil is dilated when mounted to the externally threaded member and the first tang engages the first tab and the second tang engages the second tab.

14. The locking fastener assembly of claim 8 including a gasket positioned between the fastener body and a head of the threaded member.

15. A locking fastener comprising:
   an unthreaded, plastic fastener body including an inner circumferential wall with a slot therethrough, the fastener body defining a central aperture having an unthreaded diameter, the slot in communication with the central aperture;
   a support collar including a curved portion and first and second tabs extending radially outward from the curved portion, the support collar disposed within the fastener body and the tabs extending into the slot, the support collar having a collar diameter equal to or less than the unthreaded diameter; and
   a locking coil including a helical portion having multiple turns and first and second tangs extending radially outward from the helical portion, the locking coil disposed within the support collar, the first and second tangs received between the first and second tabs, the locking coil having a coil diameter less than the collar diameter.

16. The locking fastener of claim 15 wherein the fastener body includes a lower shoulder having a shoulder diameter less than the coil diameter.

17. The locking fastener of claim 16 wherein the fastener body includes a main body and a cap, the locking coil is enclosed within the main body between the cap and the shoulder.

18. The locking fastener of claim 17 wherein the cap is affixed to an upper end of the main body.

19. The locking fastener of claim 16 wherein the locking fastener is rotated in a first direction during installation of the locking fastener onto an externally threaded member, and the first tang of the locking coil is configured to contact the first tab of the support collar.

20. The locking fastener of claim 19 wherein the locking fastener is rotated in a second direction during removal of the locking fastener from an externally threaded member, and the second tang of the locking coil is configured to contact the second tab of the support collar.

* * * * *